United States Patent
Shaw et al.

(10) Patent No.: US 10,389,082 B1
(45) Date of Patent: Aug. 20, 2019

(54) RARE-EARTH-DOPED TERNARY SULFIDES FOR MID-WAVE AND LONG-WAVE IR LASERS

(71) Applicant: The Government of the United States of America, as represented by the Secretary of the Navy, Arlington, VA (US)

(72) Inventors: L. Brandon Shaw, Woodbridge, VA (US); Michael P. Hunt, Alexandria, VA (US); Woohong Kim, Lorton, VA (US); Shyam S. Bayya, Ashburn, VA (US); Steven R. Bowman, Edgewater, MD (US); Frederic H. Kung, Alexandria, VA (US); Jasbinder S. Sanghera, Ashburn, VA (US); Christopher G. Brown, Waldorf, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/949,573

(22) Filed: Apr. 10, 2018

Related U.S. Application Data

(60) Provisional application No. 62/483,894, filed on Apr. 10, 2017.

(51) Int. Cl.
*H01S 3/16* (2006.01)
*H01S 3/17* (2006.01)
(Continued)

(52) U.S. Cl.
CPC ........ *H01S 3/1685* (2013.01); *C01F 17/0087* (2013.01); *C09K 11/7768* (2013.01); *H01S 3/0602* (2013.01); *H01S 3/163* (2013.01); *H01S 3/1613* (2013.01); *H01S 3/171* (2013.01); *C01P 2002/54* (2013.01); *H01S 3/161* (2013.01); *H01S 3/1603* (2013.01); *H01S 3/1605* (2013.01); *H01S 3/1606* (2013.01); *H01S 3/1608* (2013.01); *H01S 3/1611* (2013.01); *H01S 3/1615* (2013.01); *H01S 3/1616* (2013.01); *H01S 3/1618* (2013.01)

(58) Field of Classification Search
CPC ...... H01S 3/1685; H01S 3/163; H01S 3/0602; H01S 3/171; H01S 3/1613; H01S 3/1608; H01S 3/1618; H01S 3/1603; H01S 3/1616; H01S 3/1605; H01S 3/1615; H01S 3/1611; H01S 3/161; H01S 3/1606; C01F 17/0087; C09K 11/7768; C01P 2002/54
See application file for complete search history.

(56) References Cited

PUBLICATIONS

M. C. Nostrand et al., "Room temperature laser action at 4.3-4.4 pm in CaGa2S4:Dy3+," Opt. Lett. 24(17):1215-1217 (Year: 1999).*
(Continued)

*Primary Examiner* — Xinning(Tom) Niu
(74) *Attorney, Agent, or Firm* — US Naval Research Laboratory; Joslyn Barritt

(57) ABSTRACT

The invention relates to rare-earth-doped ternary sulfides. The rare-earth-doped ternary sulfides may be used as an active material for mid-wave infrared and long-wave infrared lasers and amplifiers. Methods for producing laser materials including rare-earth-doped ternary sulfides, as well as lasers and amplifiers incorporating the laser materials, are also provided.

9 Claims, 6 Drawing Sheets

(51) Int. Cl.
*H01S 3/06* (2006.01)
*C09K 11/77* (2006.01)
*C01F 17/00* (2006.01)

(56) References Cited

PUBLICATIONS

S.R. Bowman, et al., "A 7-µm praseodymium-based solid-state laser," IEEE J. Quantum Electron. 32(4):646-649 (1996).
S.R. Bowman, et al., "New mid-IR laser based on an erbium activated low phonon energy crystal," Conference on Lasers and Electro-Optics, J. Kafka et al., eds., OSA Technical Digest (Optical Society of America, 2001), paper CFD2.
C. Nostrond, et al., "Room temperature laser action at 4.3-4.4 µm in CaGa2S4:Dy3+," Opt. Lett. 24(17):1215-1217 (1999).
L.B. Shaw, et al., "Mid-Wave IR and Long-Wave IR Laser Potential of Rare-Earth Doped Chalcogenide Glass Fiber," IEEE J. Quantum Electron., 48(9):1127-1137 (2001).
J. Corvino, et al., "Development of Calcium Lanthanum Sulfide as an 8-12 µm Transmitting Ceramic," Proc. SPIE, vol. 0505, Advances in Optical Materials, pp. 42-46 (1984).
L.B. Shaw, et al., "Radiative and Multiphoton Relaxation of the Mid-IR Transitions of Pr3+ in LaCI3," IEEE J. Quantum Electron., 32(12):2166-2172 (1996).
W.J. Miniscalco and R.S. Quimby, "General procedure for the analysis of Er3+ cross sections," Opt. Lett., 16(4):258-260 (1991).
P.L. Provenzano, et al., "Vibrational spectra of ternary sulfides with Th3P4 structure," Mat. Res. Bull., 12 (1977).

\* cited by examiner

RARE-EARTH-DOPED TERNARY SULFIDES FOR MID-WAVE AND LONG-WAVE IR LASERS

CROSS-REFERENCE TO RELATED APPLICATIONS

This application claims priority to U.S. Provisional Application No. 62/483,894, filed on Apr. 10, 2017, the contents of which are incorporated herein by reference in their entirety.

TECHNICAL FIELD

This application relates generally to rare-earth-doped ternary sulfides. The rare-earth-doped ternary sulfides may be used as active materials for mid-wave infrared and long-wave infrared lasers and amplifiers. Methods for producing laser materials including rare-earth-doped ternary sulfides, as well as lasers and amplifiers incorporating the laser materials, are also provided.

BACKGROUND OF THE INVENTION

Rare-earth ions doped into a suitable laser host, such as crystal (e.g. YAG), ceramic, or glass (silica), are used to form lasers and optical amplifiers used for a variety of applications such as materials processing, laser surgery, etc. High power lasers for these applications operate within the 1-2 µm spectral range.

Current laser materials used for mid-wave infrared (MWIR) and long-wave infrared (LWIR) solid-state lasers are hygroscopic or lack suitable sites for the active rare-earth-doping ion. Lasers based on these materials operate at low power levels and are not durable.

While direct mid-IR laser emission in halide materials such as $LaCl_3$ and $KPb_2Cl_5$ has been demonstrated (S. R. Bowman, et al., "A 7-µm praseodymium-based solid-state laser," *IEEE J. Quantum Electron.* 32(4):646-649 (1996); S. R. Bowman, et al., "New mid-IR laser based on an erbium activated low phonon energy crystal," *Conference on Lasers and Electro-Optics*, J. Kafka et al., eds., OSA Technical Digest (Optical Society of America, 2001), paper CFD2; C. Nostrond, et al., "Room temperature laser action at 4.3-4.4 µm in $CaGa_2S_4:Dy^{3+}$," *Opt. Lett.* 24(17):1215-1217 (1999)), the halide host materials suffer from either durability issues due to high hygroscopicity ($LaCl_3$) or low-rare-earth dopant concentration due to lack of a suitable site for rare-earth doping ($KPbCl_5$, $CaGa_2S_4$). Lasers based on these materials operate at low power levels, and are not durable.

Mid-IR transitions have also been studied in glass hosts such as chalcogenide glass (L. B. Shaw, et al., "Mid-Wave IR and Long-Wave IR Laser Potential of Rare-Earth Doped Chalcogenide Glass Fiber," *IEEE J. Quantum Electron.*, 48(9):1127-1137 (2001)). Here again, the chalcogenide glasses do not possess a site for the rare-earth ion, making rare-earth doping difficult.

$CaLa_2S_4$ is an environmentally-durable cubic crystalline material with broad transmission out to 14 µm. $CaLa_2S_4$ has been fabricated and studied in the past as a potential long-wave-IR window and dome material (J. Corvino, et al., "Development of Calcium Lanthanum Sulfide as an 8-12 µm Transmitting Ceramic," *Proc. SPIE*, Vol. 0505, Advances in Optical Materials, pages 42-46 (1984)); however, the potential of calcium lanthanum sulfide and other ternary sulfides as a host material for MWIR and LWIR lasers has not previously been assessed.

SUMMARY OF THE INVENTION

The invention described herein, including the various aspects and/or embodiments thereof, meets the unmet needs of the art, as well as others, by providing rare-earth-doped ternary sulfides. The rare-earth-doped ternary sulfides may be used as active materials for mid-wave infrared and long-wave infrared lasers and amplifiers. Methods for producing laser materials including rare-earth-doped ternary sulfides, as well as lasers and amplifiers incorporating the laser materials, are also provided.

In one aspect of the invention, gain media are provided, which include a ternary sulfide host material of formula $A_xB_{3-x}S_4$, where A is one or more Group II elements, B is one or more Group III elements, and x is from about 0.1 to about 2.5. The host material is doped with one or more rare-earth ions to form gain media. The gain media may emit wavelengths from 2 µm to 12 µm.

In another aspect of the invention, gain media are provided which include calcium lanthanum sulfide doped with one or more rare-earth ions. In some aspects, the rare-earth ion is praseodymium.

According to an additional aspect of the invention, a laser is provided that includes a pump source, an optical cavity, and a gain media. The gain media includes a ternary sulfide host material of formula $A_xB_{3-x}S_4$, where A is one or more Group II elements, B is one or more Group III elements, and x is from about 0.1 to about 2.5. The host material is doped with one or more rare-earth ions to form gain media. The gain media may emit wavelengths from 2 µm to 12 µm.

In a further aspect of the invention, a laser is provided that includes a pump source, an optical cavity, and a gain medium. The gain media includes calcium lanthanum sulfide doped with one or more rare-earth ions. In some aspects, the rare-earth ion is praseodymium. In additional aspects, the gain medium may emit wavelengths from 2 µm to 12 µm.

Other features and advantages of the present invention will become apparent to those skilled in the art upon examination of the following or upon learning by practice of the invention.

DETAILED DESCRIPTION OF EMBODIMENTS OF THE INVENTION

Figure 1:
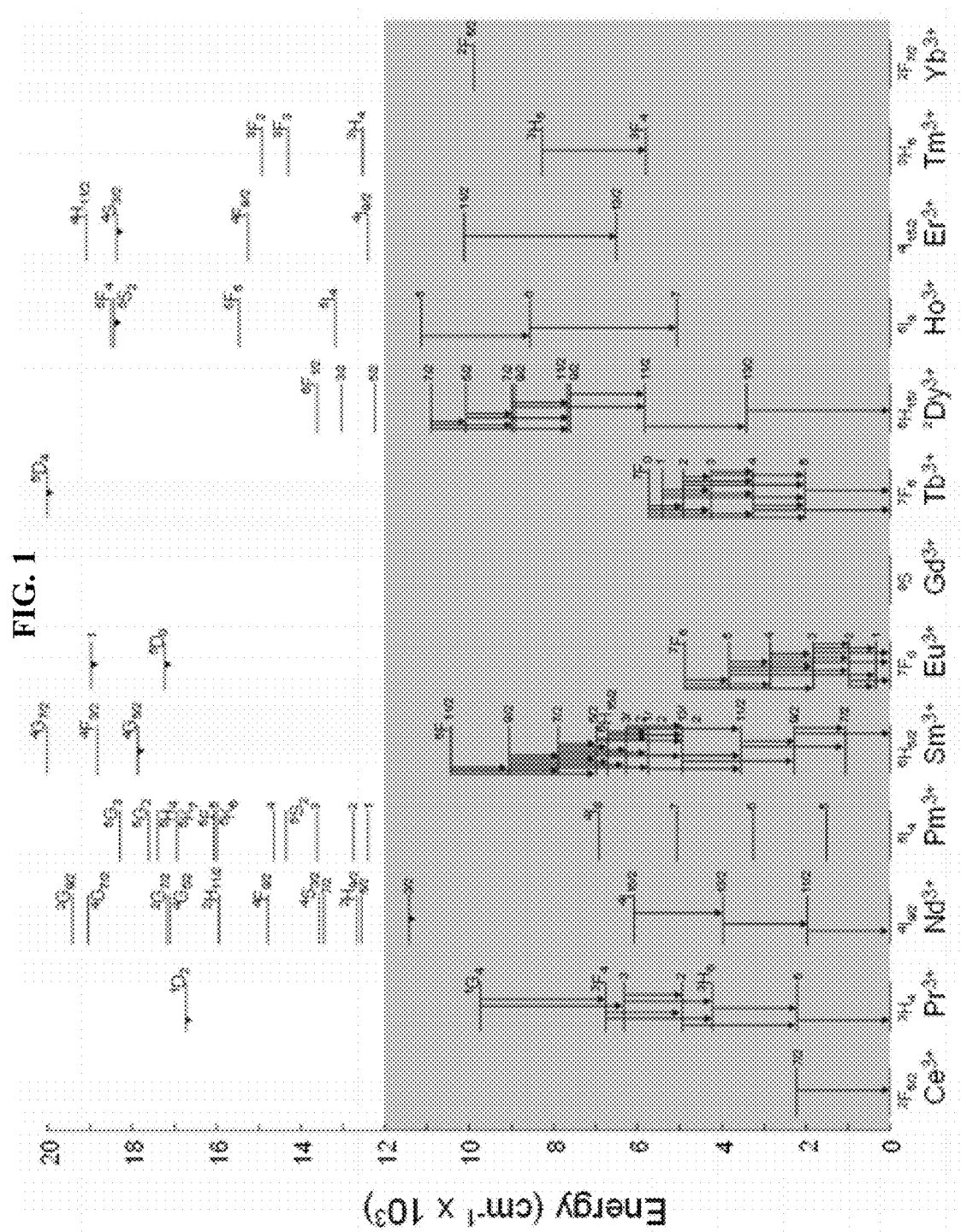
FIG. 1 is a graph showing rare-earth transitions above 3 µm that are easily pumpable with current laser technology above ~800 nm.

The invention described herein, including the various aspects and/or embodiments thereof, meets the unmet needs of the art, as well as others, by providing rare-earth-doped ternary sulfides. The rare-earth-doped ternary sulfides may be used as active materials for mid-wave infrared and long-wave infrared lasers and amplifiers. Methods for producing active materials including rare-earth-doped ternary sulfides, as well as lasers and amplifiers incorporating the laser materials, are also provided.

Rare-earth ions exhibit many transitions that can be exploited for development of lasers in the MWIR and LWIR spectral regions spanning wavelengths from 3-12 µm, and particularly the regions from 2-5 µm and 8-12 µm. In a suitable host, these transitions can exhibit long energy storage lifetimes of milliseconds as well as strong emission cross-sections. Most importantly, many of these transitions can be excited by pumping with commercially available near-IR fiber lasers or diode lasers operating in the 1-2 µm spectral region, which encompasses near-infrared and short-wavelength infrared. To date, however, development of solid-state lasers based upon the rare-earth MWIR and LWIR transitions has been limited by availability of suitable laser host materials for the rare-earth ions.

The invention beneficially provides lasers and optical amplifiers that operate in the MWIR and LWIR, and enables methods of making lasers and optical amplifiers that operate in the MWIR and LWIR. They may be used for applications that include, but are not limited to, materials processing, cutting, chemical/industrial sensing, and medical applications. These lasers may operate at high power levels. New durable laser materials with desirable properties for MWIR and LWIR solid-state lasers are needed to achieve these and other goals.

Active Materials.

The invention provides rare-earth-doped ternary sulfides as mid-wave-IR and long-wave-IR solid-state active materials. To date, rare-earth ion MWIR and LWIR transitions have not been demonstrated in calcium lanthanum sulfide ($CaLa_2S_4$, or "CLS"). Rare-earth-doped calcium gadolinium sulfide, rare-earth-doped strontium lanthanum sulfide, and rare-earth-doped strontium gadolinium sulfide are also provided for use as active materials.

Rare-earth ions can be doped into the host materials of the invention to form the active laser materials (which may also be referred to as the active material, gain medium, or lasing medium). The host materials may be formed from ternary sulfides having lanthanide sites. Rare-earth doping of the host materials of the invention provides active materials that can be used to achieve lasers and optical amplifiers operating at infrared wavelengths, which includes wavelengths from about 700 nm to about 1 mm, preferably wavelengths from about 1.4 µm to 15 µm, more preferably wavelengths from 2-12 µm, and particularly at wavelengths from 2-5 µm and 8-12 µm. The lanthanide sites may be substituted wholly or partially using a single species of rare-earth ion, or using any combination of two or more species of rare-earth ions, and the choice of rare-earth ion(s) for doping may be made based on the desired operating wavelength(s) for the laser or amplifier.

Figure 3:
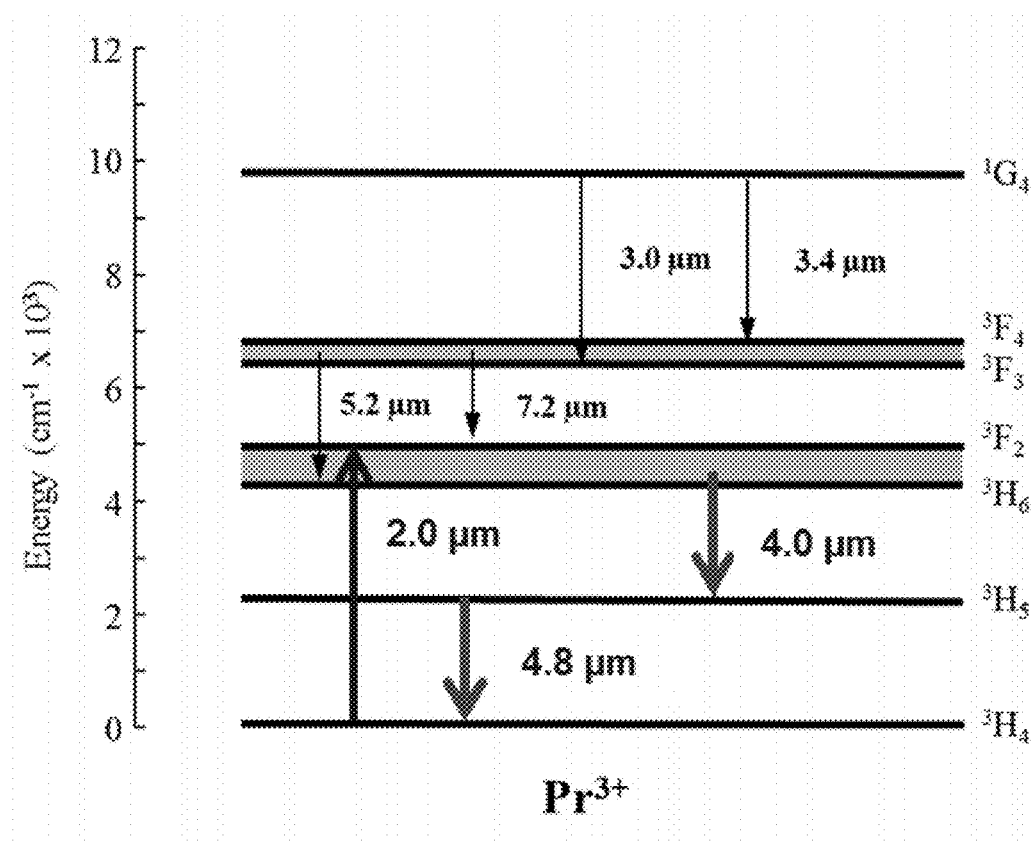
FIG. 3 is an energy level diagram showing MWIR and LWIR transitions of $Pr^{3+}:CaLa_2S_4$.

There are many rare-earth ions that exhibit MWIR and LWIR transitions. Rare-earth ions suited for use in doping host materials to form the active materials of the invention include, but are not limited to, ions of the rare-earth elements cerium (e.g., $Ce^{3+}$), dysprosium (e.g., $Dy^{3+}$), erbium (e.g., $Er^{3+}$), europium (e.g., $Eu^{3+}$), holmium (e.g., $Ho^{3+}$), neodymium (e.g., $Nd^{3+}$), praseodymium (e.g., $Pr^{3+}$), promethium (e.g., $Pm^{3+}$), samarium (e.g., $Sm^{3+}$), terbium (e.g., $Tb^{3+}$), thulium (e.g., $Tm^{3+}$), ytterbium (e.g., $Yb^{3+}$). FIG. 1 shows that potential rare-earth transitions above 3 µm are pumpable by current laser technology above 800 nm, and the transitions for praseodymium ($Pr^{3+}$) are shown in FIG. 3.

In accordance with the invention, candidate host materials for the rare-earth ions should have a low phonon energy as compared to common laser host materials (preferably less than 500 cm$^{-1}$, more preferably less than 350 cm$^{-1}$), which allows the MWIR and LWIR rare-earth laser transitions to be active, and not quenched. The host material should also exhibit broad transmission over the visible-to-LWIR spectrum. The host material should be non-hygroscopic, durable, and hard, and should possess a site that is capable of high levels of doping with rare-earth ions. The doping site may be a lanthanide site. The dopant in the host material should also have a broad emission bandwidth, enabling the formation of MWIR and LWIR ultrashort pulse lasers.

The host for the rare-earth ions is preferably a ternary sulfide. Ternary sulfides have a low phonon energy and a site for rare-earth dopants. Preferably, the site for rare-earth dopants is a lanthanide site. The ternary sulfide may have the general formula $$A_xB_{3-x}S_4$$

where A is one or more Group II elements, B is one or more Group III elements, and $0.1 \leq x \leq 2.5$. In some aspects of the invention, $0.5 \leq x \leq 2.0$. In other aspects of the invention, x is preferably about 1. In further aspects of the invention, x=1. The one or more Group II elements are alkaline earth metals, and may be selected from the group that includes beryllium (Be), magnesium (Mg), calcium (Ca), strontium (Sr), barium (Ba), radium (Ra), and combinations thereof. The one or more Group III elements are rare earth elements, and may be selected from the group that includes cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), yttrium (Y), and combinations thereof. The preferred ternary sulfides of the invention include, but are not limited to, calcium lanthanum sulfide ($CaLa_2S_4$ or CLS), calcium gadolinium sulfide ($CaGd_2S_4$), strontium lanthanum sulfide ($Sr(LaS_2)_2$), and strontium gadolinium sulfide ($SrGd_2S_4$). CLS is particularly preferred in accordance with some aspects of the invention. Additional ternary sulfides are also envisioned in which more than one rare earth element (B) or more than one alkaline earth element (A) is present, e.g., $CaLaGdS_4$.

The active materials of the invention serve as the source of optical gain within the lasers and amplifiers of the invention. In particular, the invention addresses the lack of suitable crystal, ceramic, or glass host materials for the rare-earth ions, and beneficially enables the rare-earth ions to be used in lasers and amplifiers, particularly in high-power lasers and amplifiers operating in the MWIR and LWIR regions. The active materials will emit MWIR and/or LWIR when pumped at an appropriate wavelength (e.g., above about 800 nm), and can amplify light to form the amplifiers and lasers of the invention. When used as active materials in lasers and amplifiers, the rare-earth-doped ternary sulfides of the invention may be provided in the form of crystalline or polycrystalline ceramic, glass, or crystal gain media.

The rare-earth-doped ternary sulfide materials may be fabricated for use as gain media in the lasers and amplifiers of the invention.

The host materials of the invention may be made using any suitable techniques, including, but not limited to, methods based on ceramic or glass fabrication technology, or crystal growth technology. Various methods and combinations of hot pressing, sintering, hot isostatic pressing, or sulfurization can be used to fabricate the host materials. The host materials may also be formed using melt growth techniques, though this is likely to be more difficult than with other host materials due to the melting point and high volatilization of sulfur.

The host materials may be doped with rare-earth ions using any suitable doping technique to obtain active materials. The resulting rare-earth-doped ternary sulfide active materials may be used as gain media for MWIR and LWIR lasers and amplifiers.

Lasers and Amplifiers.

Lasers in accordance with the invention may be formed by incorporating the inventive rare-earth-doped active materials (also known as gain media) into laser components known to those skilled in the art. In addition to the gain media, these include, but are not limited to, a pump source, and reflective elements configured to form an optical cavity at the signal wavelength or wavelengths. The reflective elements may include mirrors or fiber Bragg gratings to resonate the signal. The reflective elements allow the pump into the cavity while allowing the signal, spontaneously generated by the gain medium, to resonate in the cavity and be amplified. Conventional laser gain media may be replaced by the inventive gain media in order to provide lasers capable of operating in the MWIR and LWIR regions at higher power levels than lasers incorporating conventional gain media. The lasers of the invention may operate at power levels of 100 W or greater, preferably 500 W or greater, more preferably 1 kW or greater. The laser may emit in continuous wave (CW) or pulsed operation.

Amplifiers in accordance with the invention may be formed by incorporating the inventive rare-earth-doped active materials (also known as gain media) into amplifier components known to those skilled in the art. In addition to the gain media, these include, but are not limited to, a pump source and a signal source. Conventional gain media may be replaced by the inventive gain media in order to provide amplifiers capable of operating in the MWIR and LWIR at higher power levels than amplifiers incorporating conventional gain media. The amplifiers of the invention may operate at power levels of 100 W or greater, preferably 500 W or greater, more preferably 1 kW or greater. The laser may emit in continuous wave (CW) or pulsed operation.

Lasers and amplifiers that incorporate the gain media of the invention may be formed by assembling these components, as well as additional optional laser or amplifier components. The lasers and amplifiers including the rare-earth-doped ternary sulfide active materials may be operated by pumping at an appropriate wavelength (e.g., above about 800 nm), so that the active materials emit in the MWIR and LWIR, and amplify the light. These amplifiers and lasers may be used in methods that include, but are not limited to, materials processing, cutting, chemical/industrial sensing, and medical applications.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1. Fabrication of $Pr^{3+}$: $CaLa_2S_4$

Polycrystalline $Pr^{3+}$ doped $CaLa_2S_4$ was produced by a ceramic process, whereby highly purified precursors were dissolved into solution, and then precipitated, dried, and then sulfurized under flowing $H_2S$ gas similar to the process described in J. Corvino, et al., "Development of Calcium Lanthanum Sulfide as an 8-12 µm Transmitting Ceramic," Proc. SPIE, Vol. 505 Advances in Optical Materials, pages 42-46 (1984). The sulfurized powders were then sintered or hot pressed and hot isostatically pressed (HIP) to fabricate the $Pr^{3+}$:$CaLa_2S_4$ samples.

This example demonstrates that rare-earth ions can be doped into the lanthanide site of the crystalline matrix. $CaLa_2S_4$ also exhibits a low phonon energy of 285 $cm^{-1}$, which is beneficial for applications involving low multiphonon quenching of the mid-IR rare-earth transitions.

Figure 2A:
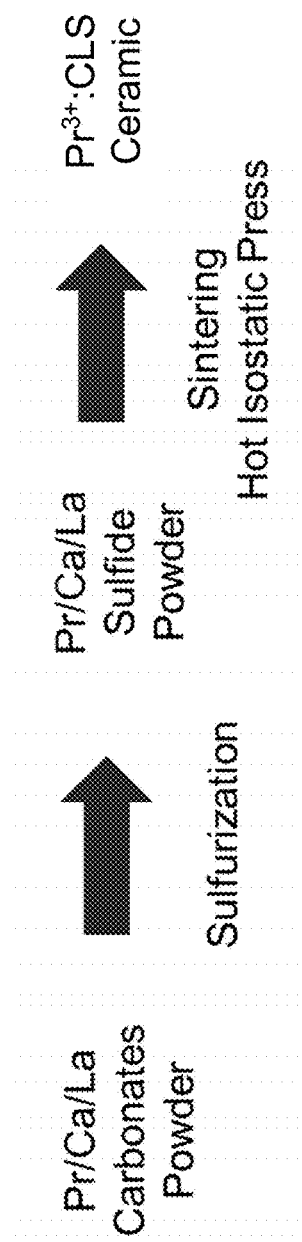
FIG. 2A is a process flow diagram for fabrication of a $Pr^{3+}:CaLa_2S_4$ sample. An image of a $Pr^{3+}:CaLa_2S_4$ sample produced using the process is shown in FIG. 2B.
Figure 2B:
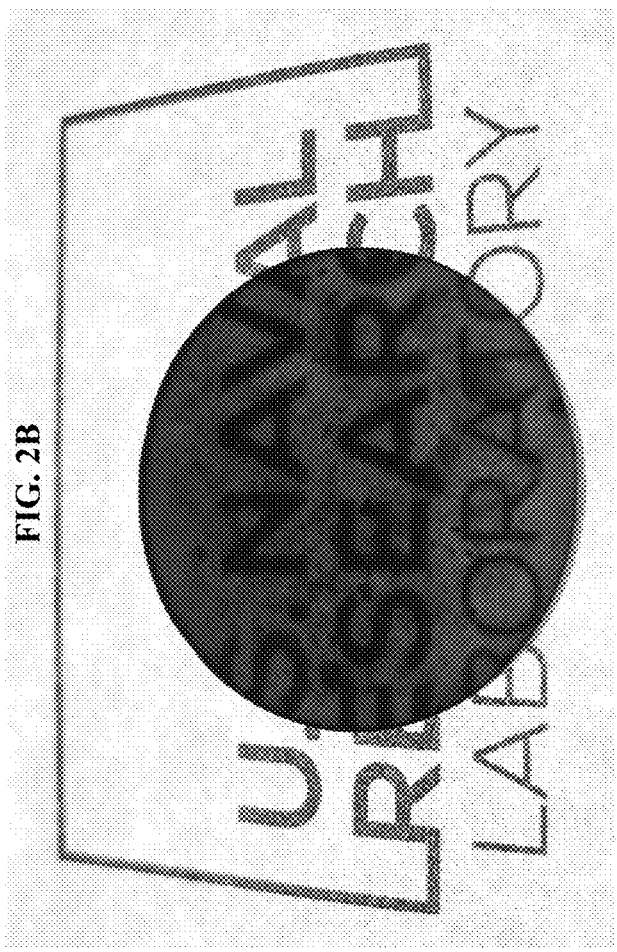

An overview of the process is shown in FIG. 2A. An image of a sample produced using the process is shown in FIG. 2B.

Example 2. Spectroscopy of $Pr^{3+}$: $CaLa_2S_4$ $Pr^{3+}$ was chosen as the dopant for study. $Pr^{3+}$ has been studied extensively in other host materials such as halide hosts (L. B. Shaw, et al., "Radiative and Multiphoton Relaxation of the Mid-IR Transitions of $Pr^{3+}$ in $LaCl_3$," IEEE J. Quantum Electron., 32(12):2166-2172 (1996)), and chalcogenide glasses (L. B. Shaw, et al., "Mid-Wave IR and Long-Wave IR Laser Potential of Rare-Earth Doped Chalcogenide Glass Fiber," IEEE J. Quantum Electron., 48(9): 1127-1137 (2001)). $Pr^{3+}$ possesses three lower lying energy levels, $^3H_5$, $^3H_6$, and $^3F_2$, with transitions in the 3-5 µm spectral region that can be easily pumped by 2 µm fiber or diode lasers. The energy level diagram of $Pr^{3+}$ is shown in FIG. 3.

Figure 4:
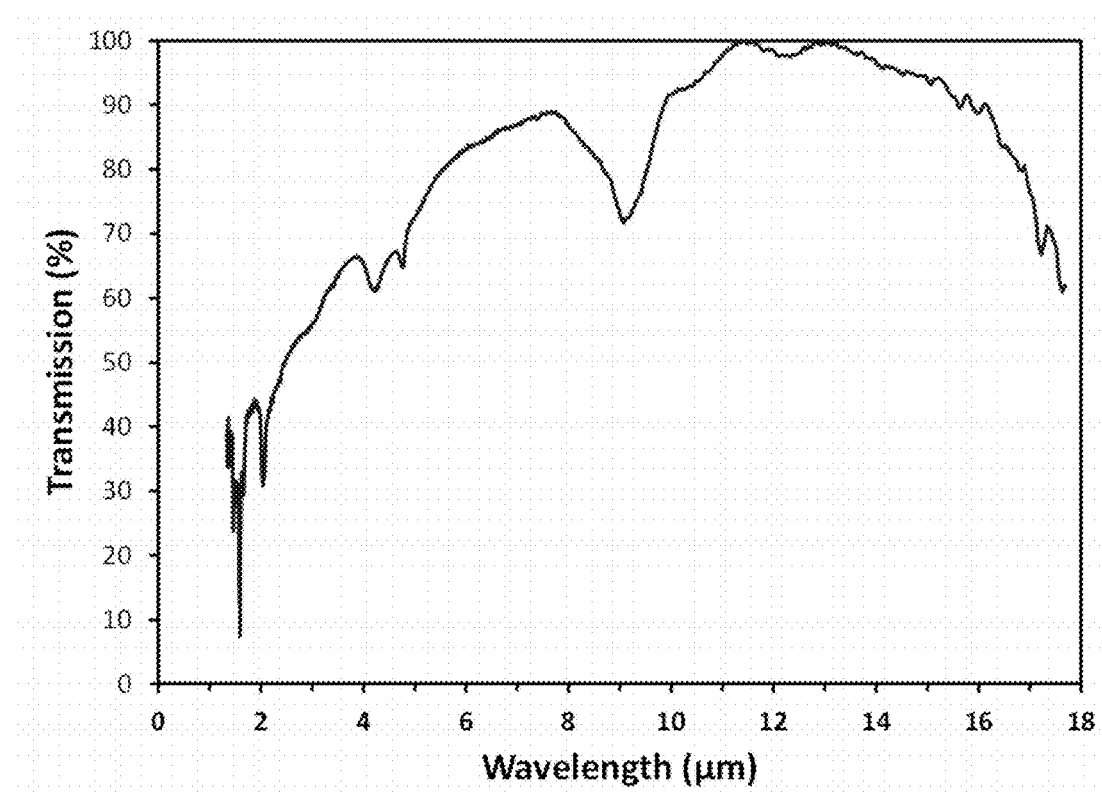
FIG. 4 is a graph showing the visible-LWIR transparency of the CLS laser material.

Transparent samples of $Pr^{3+}$:$CaLa_2S_4$ were spectroscopically characterized. The samples exhibited broad transparency and low phonon energy, as shown in FIG. 4. Samples were typically 2 cm in diameter and 1-3 mm thick. Samples showed high inclusion of carbon impurities as a by-product of the sulfurization process as well as a large oxide impurity band due to incomplete sulfurization. Nonetheless, samples were transparent from visible to 14 µm. Transmission spectrum of the $Pr^{3+}$:$CaLa_2S_4$ showed broad transmission from visible to 14 µm with distinct absorptions corresponding transitions from the ground state $^3H_4$ to the $^3H_5$, with a peak absorption at ~4.2 µm and 4.75 µm, and from $^3H_4$ to the $^3H_6$ and $^3F_2$ levels, with a peak absorption at ~2 µm, thereby revealing mid-IR emission from the $^3F_2$, $^3H_6$, and $^3H_5$ levels of $Pr^{3+}$ in this host.

Figure 5:
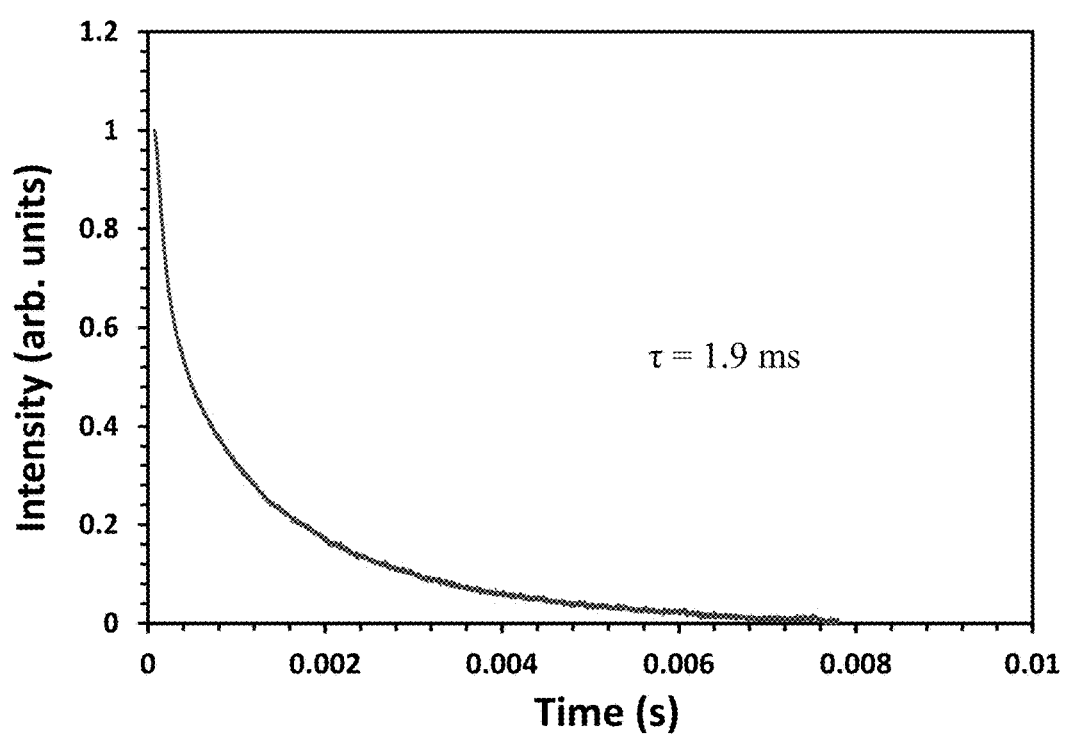
FIG. 5 is a graph showing fluorescence decay of $^3F_2$, $^3H_6$ and $^3H_5$ MWIR emitting levels of $Pr^{3+}:CaLa_2S_4$. Decay is non-exponential, with a 1.9 ms lifetime for tail of the decay

For lifetime measurements, samples were pumped at 2 µm with a pulsed diode laser and the mid-IR emission from 3-5 µm was recorded. As the $^3F_2 \rightarrow ^3H_5$, $^3H_6 \rightarrow ^3H_5$ and the $^3H_5 \rightarrow ^3H_4$ emissions spectrally overlap, it is difficult to separate the lifetime of each individual transition. The decay was non-exponential with a 1.9 ms lifetime for the tail of the decay. The lifetime is shown in FIG. 5. From studies of $Pr^{3+}$ in other host materials, it is known that the longest lifetime is typically due to the $^3H_5 \rightarrow ^3H_4$ transition (L. B. Shaw, et al., "Mid-Wave IR and Long-Wave IR Laser Potential of Rare-Earth Doped Chalcogenide Glass Fiber," IEEE J. Quantum

*Electron.*, 48(9):1127-1137 (2001); L. B. Shaw, et al., "Radiative and Multiphoton Relaxation of the Mid-IR Transitions of $Pr^{3+}$ in $LaCl_3$," *IEEE J. Quantum Electron.*, 32(12):2166-2172 (1996)). Consequently, we expect the 1.9 ms is most likely representative of the $^3H_5 \rightarrow {}^3H_4$ transition. Longer lifetimes may be possible with reduction of oxide impurities in the sample which may currently contribute to multiphonon quenching of these transitions.

Figure 6:
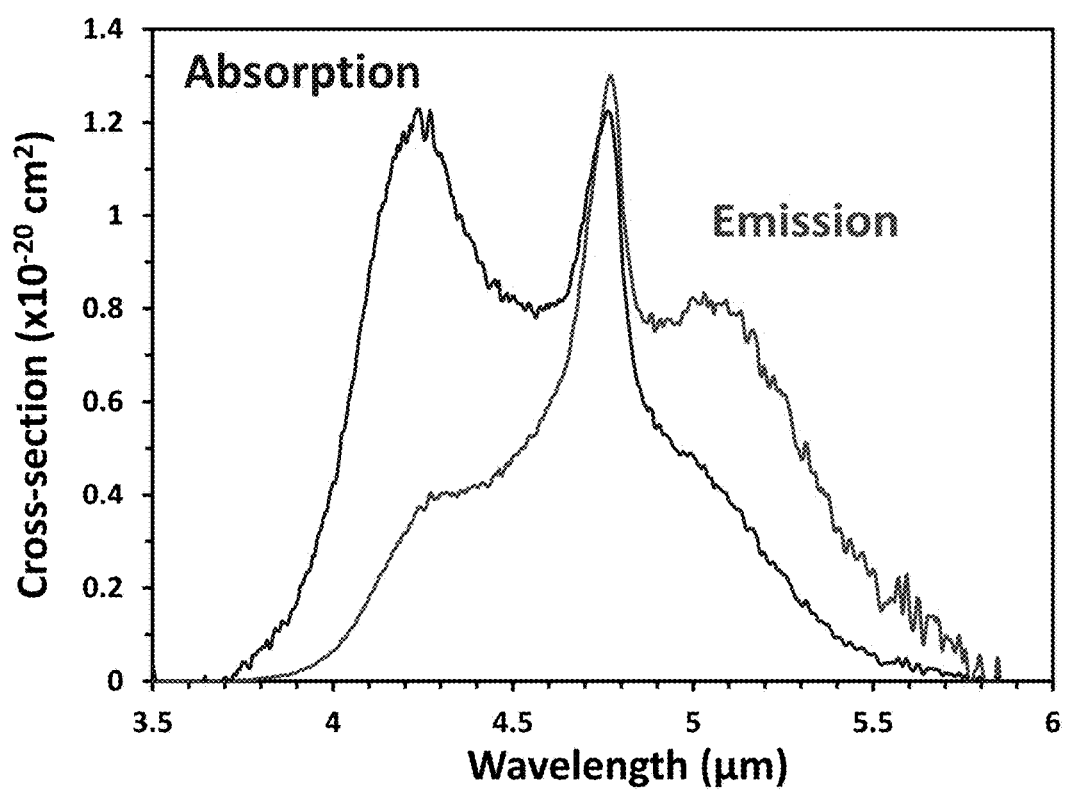
FIG. 6 is a graph showing emission and absorption cross-sections of the $^3H_5$ transition of $Pr^{3+}:CaLa_2S_4$.

To determine emission cross sections, a McCumber analysis of the $^3H_5$ was performed utilizing the absorption spectrum from $^3H_4 \rightarrow {}^3H_5$. For the analysis, the electronic structure of the manifolds was estimated using equally spaced Stark levels (W. J. Miniscalco and R. S. Quimby, "General procedure for the analysis of $Er^{3+}$ cross sections," *Opt. Lett.*, 16(4):258-260 (1991)). The measured absorption cross-section and calculated emission cross-section is shown in FIG. 6. As shown, the $^3H_5 \rightarrow {}^3H_4$ transition is centered around 4.75 μm and is quite broad with a FWHM of ~0.8 μm. The peak emission cross-section at 4.75 μm is ~$1.3 \times 10^{-20}$ $cm^2$.

The strong and broad emission is favorable for not only tunable CW pulsed laser operation in the mid-IR, but also for ultrashort pulse lasing in the mid-IR.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A laser gain medium comprising polycrystalline cubic $CaLa_2S_4$ doped with rare-earth ions on a lanthanide site thereof; wherein the gain media emits wavelengths from 2 μm to 12 μm.

2. The gain media of claim 1, wherein the rare-earth ions are selected from the group consisting of cerium ions, dysprosium ions, erbium ions, europium ions, holmium ions, neodymium ions, praseodymium ions, promethium ions, samarium ions, terbium ions, thulium ions, ytterbium ions, and combinations thereof.

3. The gain media of claim 1, wherein the gain media emits wavelengths from 2 μm to 5 μm.

4. The gain media of claim 1, wherein the gain media emits wavelengths from 8 μm to 12 μm.

5. A laser, comprising: a pump source; an optical cavity; and a laser gain medium comprising polycrystalline cubic $CaLa_2S_4$ doped with rare-earth ions on a lanthanide site thereof; wherein the gain media emits wavelengths from 2 μm to 12 μm.

6. The laser of claim 5, wherein the rare-earth ions are selected from the group consisting of cerium ions, dysprosium ions, erbium ions, europium ions, holmium ions, neodymium ions, praseodymium ions, promethium ions, samarium ions, terbium ions, thulium ions, ytterbium ions, and combinations thereof.

7. The laser of claim 5, wherein the gain media emits wavelengths from 2 μm to 5 μm.

8. The laser of claim 5, wherein the gain media emits wavelengths from 8 μm to 12 μm.

9. The laser of claim 5, wherein the rare-earth ions comprise praseodymium ions.

* * * * *